United States Patent
Medcalf et al.

[11] Patent Number: 6,110,249
[45] Date of Patent: Aug. 29, 2000

[54] FILTER ELEMENT WITH MEMBRANE AND BICOMPONENT SUBSTRATE

[75] Inventors: Bradley Duane Medcalf, Booneville, Mo.; James Roy Doehla, Shawnee Mission; Anthony Joseph Thill, Overland Park, both of Kans.; Vikas Madhusudan Nadkarni, Pune, India

[73] Assignee: BHA Technologies, Inc., Kansas City, Mo.

[21] Appl. No.: 09/277,516

[22] Filed: Mar. 26, 1999

[51] Int. Cl.⁷ ....................................................... B01D 29/13
[52] U.S. Cl. ......................... 55/514; 55/498; 55/524; 55/528; 55/DIG. 5; 96/13
[58] Field of Search .............................. 55/497, 498, 500, 55/514, 524, 528, DIG. 5; 96/12, 13

[56] References Cited

U.S. PATENT DOCUMENTS

| | | |
|---|---|---|
| 4,657,804 | 4/1987 | Mays et al. . |
| 4,816,328 | 3/1989 | Saville et al. .......................... 55/528 X |
| 4,877,433 | 10/1989 | Oshitari .................................. 55/528 X |
| 4,878,930 | 11/1989 | Manniso ................................ 55/498 X |
| 4,917,714 | 4/1990 | Kinsley, Jr ............................. 55/528 X |
| 4,983,434 | 1/1991 | Sassa ...................................... 55/528 X |
| 5,037,457 | 8/1991 | Goldsmith et al. .......................... 96/12 |
| 5,082,472 | 1/1992 | Mallouk et al. ........................ 96/12 X |
| 5,096,473 | 3/1992 | Sassa et al. ........................... 55/528 X |
| 5,108,474 | 4/1992 | Riedy et al. ........................... 55/497 X |
| 5,154,827 | 10/1992 | Ashelin et al. ......................... 96/12 X |
| 5,207,812 | 5/1993 | Tronto et al. .......................... 55/528 X |
| 5,284,704 | 2/1994 | Kochesky et al. ..................... 55/528 X |
| 5,318,831 | 6/1994 | Hirama et al. . |
| 5,478,372 | 12/1995 | Stark ...................................... 55/528 X |
| 5,504,139 | 4/1996 | Davies et al. . |
| 5,507,847 | 4/1996 | George et al. ......................... 55/497 X |
| 5,527,569 | 6/1996 | Hobson et al. ........................ 55/528 X |
| 5,540,979 | 7/1996 | Yahiaoui et al. . |
| 5,580,459 | 12/1996 | Powers et al. . |
| 5,593,778 | 1/1997 | Kondo et al. . |
| 5,607,491 | 3/1997 | Jackson et al. ............................ 55/528 |
| 5,658,269 | 8/1997 | Osborn, III et al. . |
| 5,792,242 | 8/1998 | Haskett .................................. 55/528 X |
| 5,855,783 | 1/1999 | Shucosky et al. ..................... 55/498 X |
| 5,888,275 | 3/1999 | Hamasaki et al. ....................... 96/13 X |
| 6,027,553 | 2/2000 | Hirano et al. ......................... 55/528 X |
| 6,030,484 | 2/2000 | Maeoka et al. ....................... 55/528 X |

FOREIGN PATENT DOCUMENTS

3-052610  3/1991  Japan .......................................... 96/12

*Primary Examiner*—Robert H. Spitzer
*Attorney, Agent, or Firm*—Greg Strugalski

[57] ABSTRACT

A filter element is adapted to be located in a gas stream. The filter element comprises a substrate having a structure selected from the group consisting of scrimed needled felt, scrimless needled felt, woven fabric and mesh. The substrate comprises at least two different materials. A first one of the materials has a first melting temperature. A second one of the materials has a second melting temperature lower than the first melting temperature. An expanded polytetrafluoroethylene filtering membrane is adapted to be located upstream relative to the substrate in the gas stream and supported by the substrate. The substrate is attached to the filtering membrane by the second material of the substrate melted to engage the membrane and fix the membrane to the substrate.

19 Claims, 5 Drawing Sheets

FILTER ELEMENT WITH MEMBRANE AND BICOMPONENT SUBSTRATE

BACKGROUND OF THE INVENTION

1. Technical Field

The present invention relates generally to a filter and filter element construction. In particular, the present invention relates to a filter element that includes a supporting substrate made from at least two materials with different melt temperatures and to a method of making the filter element.

2. Description of the Prior Art

It is known that efforts throughout the world to improve air quality continually increase through regulations which limit the amount of allowable industrial emissions released into the atmosphere. Improved and more efficient filters that minimize and reduce the release of emissions have been developed. One such filter includes a filter element with a microporous expanded polytetrafluoroethylene (ePTFE) membrane. The membrane assumes a relatively large percentage of the filtering duties when attached to a support structure, such as a substrate.

It is known that problems can result from attaching together the membrane and the substrate. For example, the membrane may be attached to the substrate by a laminating operation that typically uses a thermal bonding process. In this thermal bonding process, fibers at an external surface of the substrate are singed to increase the area of the substrate that can contact the membrane. The membrane and substrate are brought into intimate contact. The singed areas of the substrate are then melted onto the membrane by the application of heat. The melted portions of the substrate flow into pores in the membrane. Once the melted portions of the substrate solidify, the membrane is fixed to the substrate.

However, the material used in the substrate can melt uncontrollably and engage a relatively large surface area of the membrane. Melted portions of the substrate that solidify can block a substantial portion of the pores in the membrane and reduce the effective filtering area of the membrane. Thus, filtration efficiency is detrimentally affected due to the inhibited airflow and a relatively large pressure drop across the filter element that can result. It is also known that as melted portions of the substrate solidify to attach to the membrane, the melted portions tend to shrink in size. This shrinkage can overstress the membrane and cause the membrane to tear or crack. This tearing or cracking of the membrane may also occur when the filter element is thermally cycled in use.

Therefore, there is a need in the filtration art for an improved filter element that is durable in various environments.

SUMMARY OF THE INVENTION

The present invention is directed to a laminated filter element having a membrane and a substrate. The present invention is also directed to a method of making the filter element. When the filter element is made according to the present invention, relatively fewer pores in the membrane are blocked by melted portions of the substrate that solidify and the possibility of tearing or cracking the membrane in use is reduced.

The filter element of the present invention includes a substrate. The substrate has a structure selected from the group consisting essentially of scrimed needled felt, scrimless needled felt, woven fabric and mesh. The substrate is made from at least two different materials. A first one of the materials has a relatively high first melting or softening temperature. A second one of the materials has a second melting or softening temperature that is relatively lower than the first melting temperature. A porous membrane is supported by the substrate. The membrane is attached to the substrate. The attachment comprises the second one of the materials melted or softened to engage the membrane and adhere the membrane to the substrate.

The porous membrane is made from expanded polytetrafluoroethylene. The second material of the substrate is located in a position capable of contacting the membrane so only the second material melts or softens to attach to the membrane. When the substrate is constructed from the scrimed needled felt or scrimless needled felt, the felt in the substrate includes a blend of at least two staple fibers. A first one of the fibers is made from the first material. A second one of the fibers is made from the second material.

According to another embodiment of the present invention at least a portion of the substrate includes a multiplicity of bicomponent staple fibers selected from the fiber structures including core-sheath, side-by-side, segmented and lobed. A portion of each of the fibers is made from the first material. Another portion of each of the fibers is made from the second material.

The substrate may comprise two layers needled together. A first one of the layers includes a majority of fibers made from the first material. A second one of the layers is located adjacent the membrane and includes second fibers made at least partially from the second material. The thickness of the first layer is greater than the thickness of the second layer.

The substrate may include a cap and a base. The cap is located adjacent to the membrane and made at least partially from the second material. The base is made mostly from the first material. The thickness of the base is greater than the thickness of the cap. The filter element may be formed into a desired shape and set to retain that shape.

A method of making a filter element comprises the steps of providing a substrate. The substrate has a structure selected from the group consisting essentially of scrimed needled felt, scrimless needled felt, woven fabric and mesh. The substrate is made from at least two different materials. A first one of the materials has a relatively high first melting or softening temperature. A second one of the materials has a second melting or softening temperature lower than the first melting temperature. A filtering membrane is provided. The filtering membrane is supported by the substrate. The filtering membrane is attached to the substrate by melting or softening the second one of the materials of the substrate onto the filtering membrane to adhere the filtering membrane to the substrate.

The step of providing a filtering membrane comprises providing a filtering membrane made from expanded polytetrafluoroethylene. The step of attaching the filtering membrane to the substrate includes melting the second one of the materials without melting the first one of the materials. The method further includes the step of forming the filter element to a desired shape prior to melting or softening the second one of the materials. The second material melts into the filtering membrane without melting the first material.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 2:
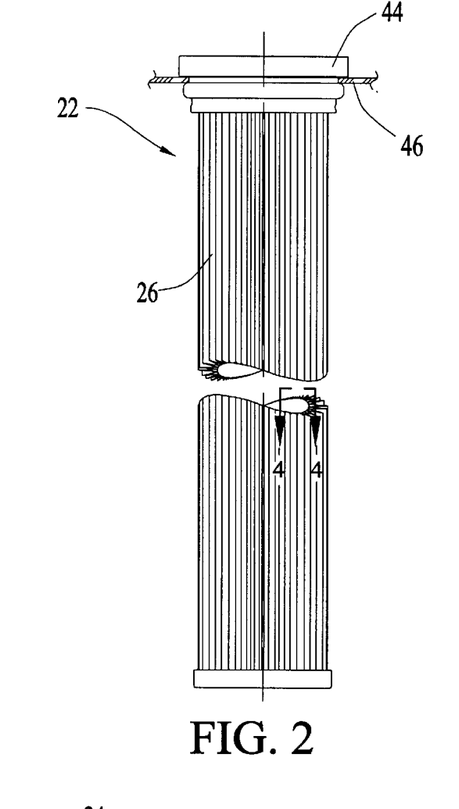
FIG. 2 is a schematic view of a cartridge filter having a pleated filter element embodying the present invention.
Figure 3:
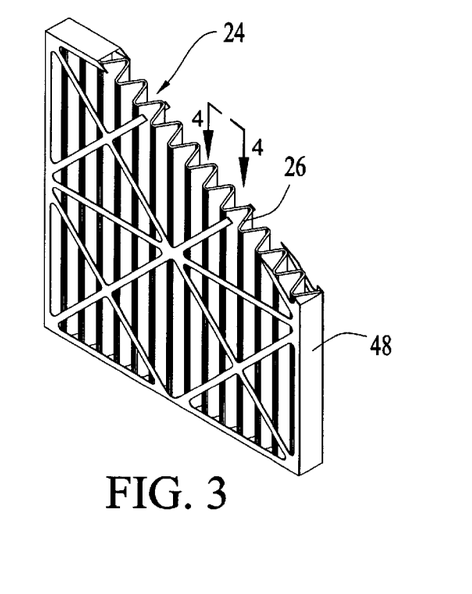
FIG. 3 is a schematic view of an HVAC filter having a pleated filter element embodying the present invention.
Figure 4:
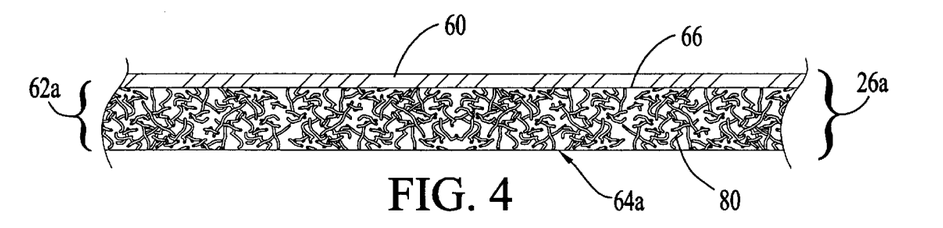
FIG. 4 is a cross-sectional view of the filter element, illustrated in FIGS. 1–3, constructed according to one embodiment of the present invention and taken approximately along the lines 4—4 in FIGS. 1–3.

A filter 20, 22, or 24 (FIGS. 1–3 ) includes a filter element constructed according to the present invention and generally designated with the reference number 26. The filter element 26 is made to filter particulate matter from a fluid stream, such as a gas stream. The filter element 26 is constructed to meet the requirements for its intended filtering function. The filters 20, 22, 24 that include the filter element 26 are shown for illustration purposes only and are not intended to limit the spirit and scope of the present invention.

By way of example, a bag filter 20 (FIG. 1) that includes the filter element 26 is supported on a cage 40. The cage 40 is attached to a baghouse tubesheet 42. A cartridge filter 22 (FIG. 2) includes the pleated filter element 26 attached to a mount 44. The mount 44 supports the cartridge filter 22 on a baghouse tubesheet 46. An HVAC filter 24 (FIG. 3) includes the filter element 26 and a frame 48. The frame 48 supports the filter element 26 and is receivable in a suitable housing (not shown).

The filter element 26a–26h (FIGS. 4–11 ), embodying the present invention and incorporated into any of the filters 20, 22, 24 (FIGS. 1–3 ), includes a filtering membrane 60 and a substrate, generally designated with the reference number 62. The filtering membrane 60 is porous, preferably microporous, and supported by the substrate 62a–h as illustrated in FIGS. 4–11. A preferred suitable microporous membrane 60 is one made from expanded polytetrafluoroethylene (ePTFE).

Figure 11:
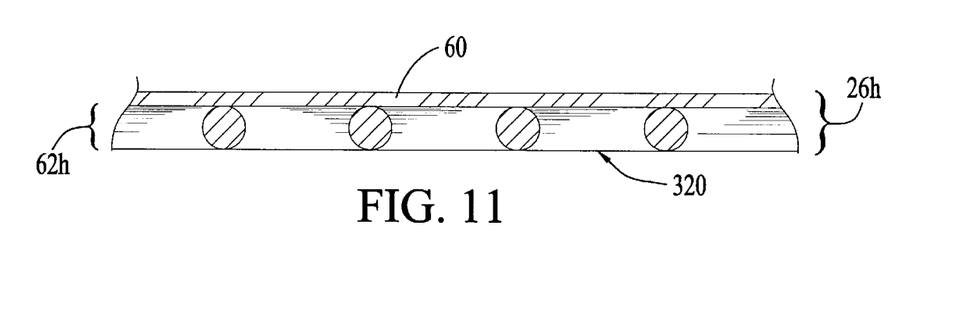

The microporous ePTFE filtering membrane 60 is preferably located upstream relative to the substrate 62 in the gas stream. The membrane 60 is physically attached to the substrate 62. The substrate 62 may be of any suitable construction that allows a relatively large amount of gas to pass through it and that is capable of performing some filtration. The substrate 62 preferably has a structure, such as scrimed needled felt 64b (FIG. 5), 64d (FIG. 7), 64e (FIG. 8) or 64f (FIG. 9), scrimless needled felt 64a (FIG. 4) or 64c (FIG. 6), woven fabric 62 g (FIG. 10) and mesh 62h (FIG. 11).

The substrate 62a–62h is made from at least two different materials. A first one of the materials has a relatively high first melting or flowable softening temperature. A second one of the materials has a second melting or flowable softening temperature that is relatively lower than the first temperature. Preferably, the second material is crystalline. When the second material of the substrate 62 is heated to a temperature greater than the second temperature but less than the first temperature, only the second material melts or softens to flow and the first material retains its properties, such as tensile strength and others. Since the second material softens or melts at a relatively lower temperature than the first material, only the softened or melted portions flow to engage the membrane 60 at numerous but relatively small areas of contact to attach the membrane to the substrate 62a–62 h. Prior to melting, the second material is preferably located in positions in the substrate 62a–62 h where it can readily engage the membrane 60, such as a major exterior side surface 66 of the substrate 62.

In one embodiment of the present invention, the filter element 26a (FIG. 4) includes the membrane 60 and the substrate 62a. The substrate 62a is constructed as a scrimless needled felt 64a. At least a portion of the needled felt 64a includes a multiplicity of fibers, such as a blend 80 (FIG. 12) of fibers 82, 84 or any of the bicomponent fibers 100, 120, 140 or 160 (FIGS. 13–16). The blend 80 of the fibers 82, 84 or any of the bicomponent fibers 100, 120, 140 or 160 may be used in the needled felt 64a only at the major exterior side surface 66 located adjacent the membrane 60 or throughout the entire needled felt.

The needled felt 64a includes a homogenous blend 80 (FIG. 12) of first fibers 82 and second fibers 84. That is the blend 80 has fifty percent of the first fibers 82 and fifty percent of the second fibers 84. The blend 80 also may include a non-homogenous mixture of the fibers 82, 84 in any suitable ratio. The first fibers 82 are made of the first material that has the relatively high and first melting or glass transition softening temperature. The second fibers 84 are made of the second material that has the second and relatively lower melting or glass transition softening temperature than the first melting temperature of the first material. It is intended that the term "melting temperature" $T_m$ also includes the glass transition softening temperature $T_g$ of a material that softens to flow rather than melt.

Figures 12, 13, 14, 15:
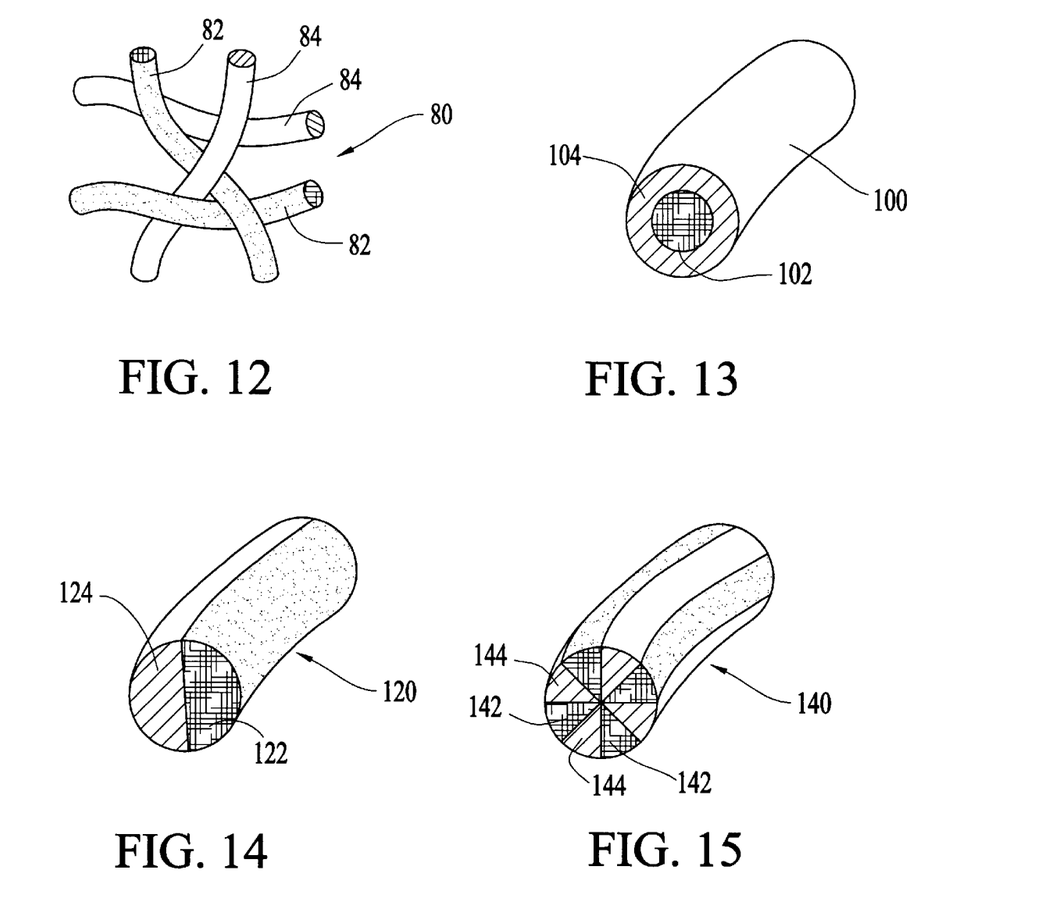
FIG. 12 is an enlarged schematic illustration of a blend of bicomponent fibers of the present invention used in a substrate of the filter element.
FIGS. 13–16 are enlarged schematic illustrations of bicomponent fibers for use in the substrate of the present invention.

The first fibers 82 in the blend 80 are made from the first material with the relatively higher first melting temperature. The second fibers 84 in the blend 80 are made from the second material with the second melting temperature that is relatively lower than the first melting temperature of the first material. The second fibers 84 melt at a lower temperature than the first fibers 82 melt at and are located in a position to easily contact the membrane 60. The first fibers 82 do not melt and are relatively unaffected when exposed to the temperature at which the second material melts so the first fibers retain their physical properties, such as tensile strength, elasticity and the like. It will be apparent that the second fibers 84 will also melt to attach to other second fibers and first fibers 82 in the needled felt 64a.

There is enough difference between the melting temperatures of the two materials and the application of heat can be controlled sufficiently so that melting of only the second material occurs. For the blend 80 of fibers 82, 84 or one of the bicomponent fibers 100, 120, 140, 160 when the first material is made, for example from polyester (PET), the first melting temperature in the range of about 473° F. to 509° F. When the second material is made, for example from nylon 6, the second melting temperature is in the range of about 410° F. to 428° F. Suitable material for use in the fibers 82, 84 of the blend 80, the bicomponent fibers 100, 120, 140, 160 or the yarn 180 includes polyester, nylon, Ryton® or Nomex® among others.

For example, suitable combinations of the higher melting temperature first material and lower melting temperature second material may include:

| First Material | $T_{m,g}$ ° F. | | Second Material | $T_{m,g}$ ° F. |
|---|---|---|---|---|
| Polyester Based Felts | | | | |
| polyethylene terephthalate (PET) | 473–509 | and | polybutylene terephthalate (PBT) | 428–548 |
| PET | 473–509 | and | polyamide 6 (Nylon 6) | 410–428 |
| PET | 473–509 | and | low melt PET | 350–425 |
| Acrylic Based Felts | | | | |
| poly-acrylonitrile (PAN) | 600–612 | and | PET | 473–509 |
| PAN | 600–612 | and | Nylon 6 | 410–428 |
| PAN | 600–612 | and | CHDM based copolyesters (PETG) 1,4 cyclohexane dimethyanol (CHDM)/(IPA) based copolyesters (PCTA) | 350 $T_g$ |
| acrylic | dnm | and | Polyphenelyne Sulfide (PPS-Ryton ®) | 545–554 |
| Ryton ® Based Felts | | | | |
| poly-phenelyne sulfide (PPS-Ryton ®) | 545–554 | and | polyethylene napthalate (PEN) | 230 $T_g$ |
| PPS | 545–554 | and | polyamide 66 (Nylon 66) | 491–509 |
| PPS | 545–554 | and | PETG | 392–401 $T_g$ |
| Nomex ® Based Felts | | | | |
| poly-m-phenylene iso-phthalamide (Nomex ®) | dnm | and | PCTA | 545 |
| Nomex ® | dnm | and | poly-ether—ether-ketone (PEEK) | 633 |

(dnm means that the material does not melt)

It is known that acrylics and Nomex® do not melt, so they are not melt processible to form a bicomponent fiber. Acrylics and Nomexec®, thus, are generally used as fibers 82 or filaments of the relatively high melt temperature first material in the blend 80. When acrylics or Nomexc® are used, the associated fibers used for the second material are prepared from a relatively high melt temperature and thermally stable polymer, such as polyphenelyne sulfide (PPS-Ryton®), polyacrylonitrile (PAN), CHDM based homopolyester (PCT), poly-ether-ketone (PEK) or poly-ether-ether-ketone (PEEK).

The needled felt 64a of the substrate 62a may also be constructed to include any of the fibers 100 (FIG. 13), 120 (FIG. 14), 140 (FIG. 15), 160 (FIG. 16) or a mixture of any of these fibers. For example, in an alternate embodiment of the present invention, at least a portion of the needled felt 64a may comprise a multiplicity of bicomponent staple core-sheath fibers 100 (FIG. 13). The inner core 102 of each fiber 100 is made of the first material with the relatively higher first melting temperature. The outer sheath 104 of each fiber 100 is made of the second material with the second melting temperature that is relatively lower than the first melting temperature of the first material. The sheath 104 melts first at a lower temperature than the core 102 and is located in a position on the fiber 100 to be easily attachable to the membrane 60. The core 102 is relatively unaffected when exposed to the temperature at which the second material melts so the first material retains its properties, such as tensile strength, elastic properties and the like.

In another alternate embodiment of the present invention, at least a portion of the needled felt 64a of the substrate 62a comprises a multiplicity of bicomponent staple side-by-side fibers 120 (FIG. 14). At least a portion 122 of each side-by-side fiber 120 is made from the first material. The remaining portion 124 of each fiber 120 is made from the second material with the relatively lower melting temperature. The portion 122 of the fiber 120 is illustrated as being approximately equal to the size of the portion 124, but it should be apparent that the relative size of the portions may be any predetermined suitable size.

In yet another alternate embodiment of the present invention, at least a portion of the needled felt 64a of the substrate 62a may comprise a multiplicity of bicomponent staple segmented fibers 140 (FIG. 15). Several segments 142 of each segmented fiber 140 are made from the first material. Several segments 144 of the segmented fiber 140 are made from the second material with the relatively lower melting temperature. The segmented fiber 140 may include any suitable number of segments 142 made from the first material and segments 144 made from the second material. It will be apparent that if one segment of each first and second materials are used, the side-by-side fiber 120 (FIG. 14) results as described above. The segments 142, 144 of the fiber 140 are illustrated as being equal in size and having a wedge-shaped cross-section. It will be apparent that the segments 142, 144 of the fiber 140 can be of any suitable size and shape.

Figure 16:
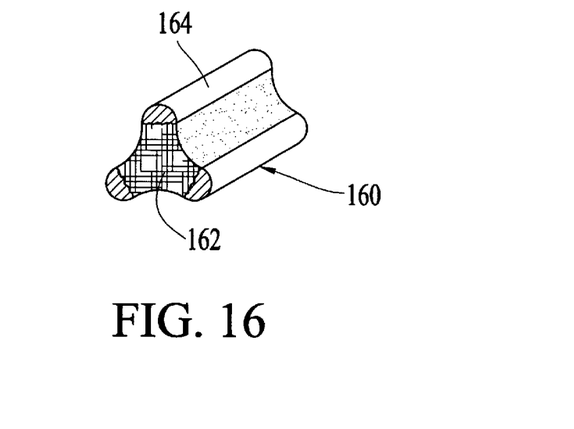

In still another alternate embodiment of the present invention, at least a portion of the substrate 62a may comprise a multiplicity of bicomponent staple lobed fibers 160 (FIG. 16). A centrally located body portion 162 of the lobed fiber 160 is made from the first material. At least one lobe 164 of the lobed fiber 160 is made from the second material with the relatively lower melting temperature. The lobed fiber 160 may include any suitable number of lobes 162 made from the second material. The lobes 164 of the fiber 160 are positioned on the fiber to be the radially outermost part of the fiber for the best possibility of contacting the membrane 60 without the body portion 162 contacting the membrane. The lobes 164 of the fiber 160 are illustrated as being equal in size, having a semi-circular cross-section and occupying an approximately equal amount of external surface area of the fiber 160. It will be apparent that the lobes 164 of the fiber 160 can be of any suitable size and shape.

In another embodiment of the present invention, the filter element 26b (FIG. 5) includes the membrane 60 and a substrate 62b. The substrate 62b is constructed with needled felt 64b on a scrim 180. The scrim 180 is illustrated as extending substantially through the middle of the needled felt 64b, but it will be apparent that the scrim could be located in any suitable position in the felt.

The scrimed needled felt 64b of the substrate 62b includes a blend 80 of the fibers 82, 84 (FIG. 12) located above and below (as viewed in FIG. 5) the scrim 180. It will be apparent that some or mostly second fibers 84 could be used above the scrim 180 and mostly or all first fibers 82 be used below the scrim. At least a portion of the scrimed needled felt 64b of the substrate 62b includes a multiplicity of fibers, such as a blend 80 (FIG. 12) of the fibers 82, 84 or any of the bicomponent fibers 100, 120, 140, 160 (FIGS. 13–16). The blend 80 (FIG. 12) of the fibers 82, 84 or any of the bicomponent fibers 100, 120, 140 or 160 (FIGS. 13–16) may be used in the substrate 62b only adjacent the membrane or throughout the entire substrate.

The needled felt 64b of the substrate 62b (FIG. 5) may include a homogenous blend 80 (FIG. 12) of the fibers 82 made from the first material and the fibers 84. The blend 80 also may include a non-homogenous mixture of the fibers 82, 84 in any suitable ratio. The second fibers 84 melt first at a lower temperature than the first fibers 82 and are located in a position to easily contact the membrane 60. The first fibers 82 are relatively unaffected when exposed to the temperature at which the second material melts so the first fibers 82 retain their physical properties, such as tensile strength, elasticity and the like.

There is enough difference between the melting temperatures of the two materials and the application of heat can be controlled sufficiently so that melting of only the second material occurs. The substrate 62b may also be constructed to include the bicomponent staple core-sheath fibers 100 (FIG. 13), side-by-side fibers 120 (FIG. 14), segmented fibers 140 (FIG. 15) or lobed fibers 160 (FIG. 16) described above in any location, but preferably at least adjacent the membrane 60.

The filter element 26c (FIG. 6) includes the membrane 60 and a substrate 62c. The substrate 62c includes scrimless needled felt 64c with a base 220 and a cap 222. At least a portion of the cap 222 is made preferably at least partially from the second fibers 84 (FIG. 12) made from the second material with the relatively lower second melting temperature. The second fibers 84 of the cap 222 are preferably needled into the fibers 82 of the base 220 to mechanically connect the cap and base. The base 220 is preferably made mostly from the fibers 82 made from the first material. Preferably, the cap 222 is significantly thinner than the base 220. The cap 222 is located adjacent the membrane 60 to place the second material with the relatively lower melting temperature where it can be utilized best.

In one embodiment of the present invention, at least a portion of the scrimed needled felt 64c comprises a multiplicity of fibers, such as the blend 80 (FIG. 12) of the fibers 82, 84. The base 220 includes mostly all first fibers 82 made of the first material with a first and relatively higher melting temperature. The blend 80 (FIG. 12) of the fibers 82, 84 may be used in the cap 222 only at a location adjacent the membrane 60 or throughout the entire cap.

The second fibers 84 in the cap 222 melt first at a lower temperature than the first fibers 82 in the base 220. The second fibers 84 in the cap 222 are preferably located in a position to easily contact the membrane 60. The first fibers 82 are relatively unaffected when exposed to the temperature at which the second material melts so the first fibers 82 retain their physical properties, such as tensile strength, elasticity and the like. There is enough difference between the first and second melting temperatures of the two materials and the application of heat can be controlled sufficiently so that melting of only the second material occurs. The cap 222 may also be constructed to include the staple bicomponent core-sheath fibers 100 (FIG. 13), side-by-side fibers 120 (FIG. 14), segmented fibers 140 (FIG. 15) or lobed fibers 160 (FIG. 16) described above.

Figure 6:
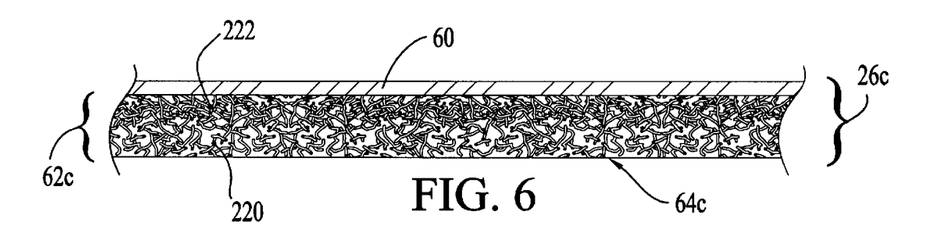

The base 220 and cap 222 may be made in separate manufacturing operations and then later needled together. The scrimless needled felt 64c may also be made by needling the base 220 and cap 222 together in a single needling operation. The base 220 may also be formed in a separate operation with just the fibers 82 with the first material with the relatively higher melting temperature. Then the fibers 84 made with the second material with the relatively lower melting temperature could be needled into the base 220 to form the cap 222, as illustrated in FIG. 6 as a denser concentration of fibers adjacent the membrane 60.

Figure 7:
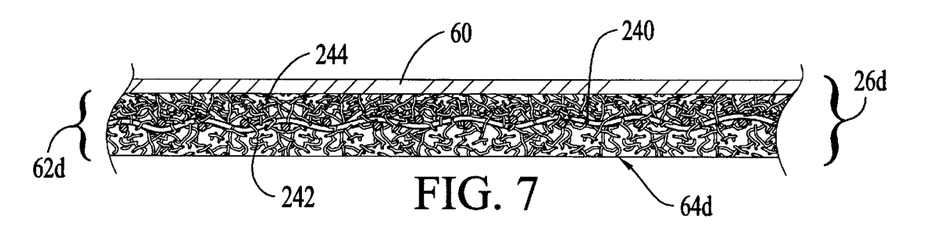

In another embodiment of the present invention, the substrate 62d (FIG. 7) is constructed to have needled felt 64d in two layers on opposite sides of a scrim 240. A first base layer 242 includes a majority of fibers made from the first material with the relatively higher melting temperature located below the scrim 240, as viewed in FIG. 7. A second cap layer 244 is located above the scrim 240, as viewed in FIG. 7, and is located adjacent the membrane 60. The second layer 244 is made at least partially from the second material with the relatively lower second melting temperature. The thickness of the first layer 242 is illustrated in FIG. 7 as being substantially equal to the thickness of the second layer 244, but it will be apparent that the first layer could be greater in thickness than the second layer.

The second layer 244 of the scrimed needled felt 64d of the substrate 62d includes a blend 80 of fibers 82, 84 made from two different materials having different melting temperatures or any of the bicomponent fibers 100, 120, 140 or 160 (FIGS. 13–16). The second material may be used in the second layer 244 only adjacent the membrane or throughout the entire second layer. This layered structure of the substrate 62d minimizes the overall use of fibers made from the second material because they are located in a portion of the substrate close to the membrane 60 where maximum effective use of the second material is achieved. The second layer 244 may include a homogenous blend 80 of the first fibers 82 and the second fibers 84. The blend 80 also may include a non-homogenous mixture of the fibers 82, 84 in any suitable ratio. The first layer 242 of the scrimed needled felt 64d includes a multiplicity of fibers 82 made mostly from the first material.

The first fibers 82 in the blend 80 are made from the first material with the relatively higher first melting temperature. The second fibers 84 in the blend 80 are made from the second material with the second melting temperature that relatively is lower than the first melting temperature of the first material. The second fibers 84 melt first at a lower temperature than the first fibers 82 and are located in a position to easily contact the membrane 60. The first fibers 82 are relatively unaffected when exposed to the temperature at which the second material melts so the first fibers 82 retain their physical properties, such as tensile strength, elasticity and the like. There is enough difference between the melting temperatures of the two materials and the application of heat can be controlled sufficiently so that melting of only the second material occurs.

The portion of the second layer 244 of the scrimed needled felt 64d may also be constructed to include any of the bicomponent core-sheath fibers 100 (FIG. 13), side-by-side fibers 120 (FIG. 14), segmented fibers 140 (FIG. 15), or lobed fibers 160 (FIG. 16) described above. For example, in an alternate embodiment of the present invention, at least a portion of the second layer 244 may comprise a multiplicity of bicomponent staple core-sheath fibers 100, 120, 140, or 160 located at least adjacent the membrane 60.

Figure 8:
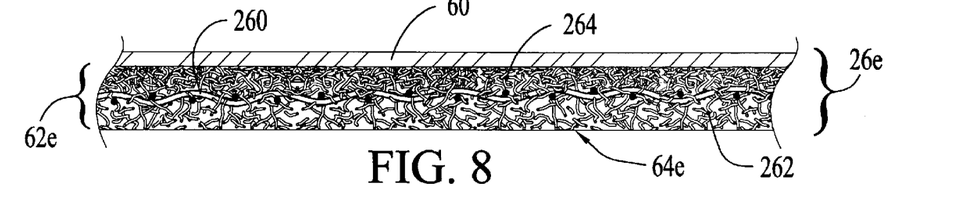

According to another embodiment of the present invention, the substrate 62e (FIG. 8) includes essentially the same structure as that of the substrate 62d (FIG. 7). The substrate 62e is constructed to have needled felt 64e in two layers on opposite sides of a scrim 260. A first layer 262 includes a majority of fibers made from the first material with the relatively higher melting temperature located below the scrim 260, as viewed in FIG. 8. A second layer 264 is located above the scrim 260, as viewed in FIG. 8, and is adjacent the membrane 60. The second layer 264 includes mostly the second material. The second layer 264 has a relatively dense fiber distribution, as illustrated in FIG. 8 resulting from additional fibers needled into fibers already present in the second layer. The thickness of the first layer 262 is illustrated in FIG. 8 as being substantially equal to the thickness of the second layer 264, but it will be apparent that the first layer could be greater in thickness than the second layer. This structure of the substrate 62e minimizes the overall use of fibers made from the second material because they are located in a portion of the substrate close to the membrane 60 where maximum effectiveness is achieved.

In one embodiment, the second layer 264 of the scrimed needled felt 64e includes the blend 80 of the fibers 82, 84 (FIG. 12) or any of the bicomponent fibers 100, 120, 140 or 160 (FIGS. 13–16). The first layer 262 of the scrimed needled felt 64e includes mostly fibers made from the first material. The second layer 264 may include a homogenous blend 80 of the first fibers 82 (FIG. 12) and the second fibers 84. The blend 80 also may include a non-homogenous mixture of the fibers 82, 84 in any suitable ratio. The blend 80 of the fibers 82, 84 may be used in the second layer 264 only adjacent the membrane 60 or throughout the entire second layer. The second layer 264 of the substrate 62e may also be constructed to include any of the bicomponent core-sheath fibers 100 (FIG. 13), side-by-side fibers 120 (FIG. 14), segmented fibers 140 (FIG. 15), or lobed fibers 160 (FIG. 16) described above.

Figure 5:
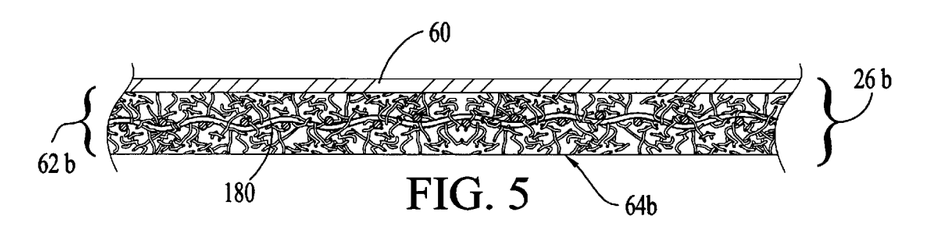
FIGS. 5–11 are cross-sectional views of the filter element, similar to FIG. 4, constructed according to alternate embodiments of the present invention.

In another embodiment of the present invention, the filter element 26f (FIG. 9) includes the membrane 60 and a substrate 62f constructed similar to that of the scrimed needled felt 64b illustrated in FIG. 5. The needled felt 64b is made mostly from the first material. The needled felt 64b includes the scrim 180. It will be apparent that the scrim 180 could be optional in this embodiment.

Figure 9:
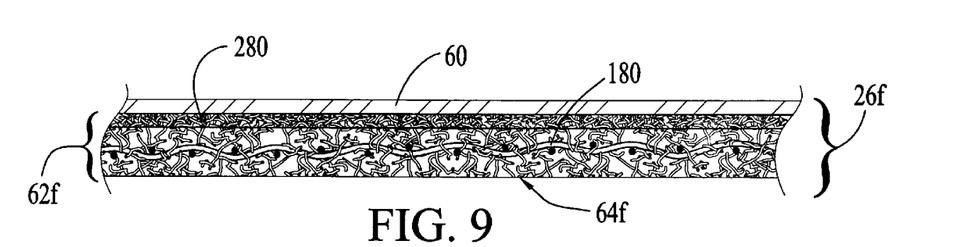
Figure 10:
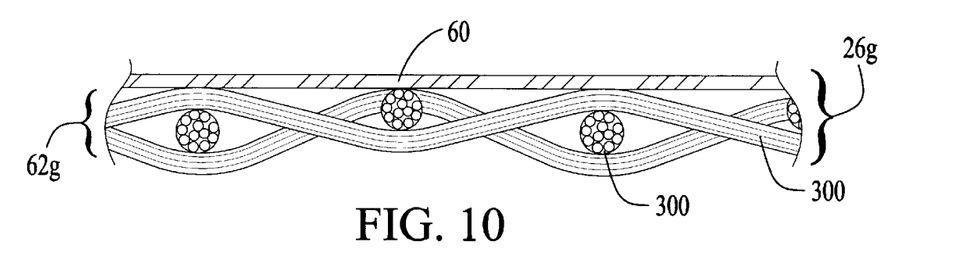

The substrate 62f includes an additional layer 280 of material located between the membrane 60 and the needled felt 64b. The additional layer 280 is relatively thinner than is the needled felt 64b. The additional layer 280 includes the bicomponent fibers 100, 120, 140, or 160 or the blend 80 of the fibers 82, 84 made from two different materials with different melting temperatures. The substrate 62f and the additional layer 280 are made in separate operations and placed in an overlying relationship to engage one another. The additional layer 280 is then brought into intimate contact with the membrane 60. The membrane 60, needled felt 64b and additional layer 280 are then thermally bonded together by melting the second material of the additional layer into both the needled felt and the membrane.

In one embodiment, the additional layer 280 of the substrate 62f includes the blend 80 of the fibers 82, 84 (FIG. 12) located above the needled felt 64b (as viewed in FIG. 9). At least a portion of the additional layer 280 of the substrate 62f includes a multiplicity of fibers, such as the blend 80 (FIG. 12) of the fibers 82, 84 or any of the bicomponent fibers 100, 120, 140, 160 (FIGS. 13–16). The additional layer 282 may include a homogenous blend 80 of the first fibers 82 (FIG. 12) and the second fibers 84. The blend 80 also may include a non-homogenous mixture of the fibers 82, 84 in any suitable ratio.

The first fibers 82 in the blend 80 are made from the first material with the relatively higher first melting temperature. The second fibers 84 in the blend 80 are made from the second material with the second melting temperature that relatively is lower than the first melting temperature of the first material. The second fibers 84 melt first at a lower temperature than the first fibers 82 and are located in a position to easily contact the membrane 60. The first fibers 82 are relatively unaffected when exposed to the temperature at which the second material melts so the first fibers 82 retain their physical properties, such as tensile strength, elasticity and the like.

There is enough difference between the melting temperatures of the two materials and the application of heat can be controlled sufficiently so that melting of only the second material occurs. The substrate 62f may also be constructed to include any of the fibers 100 (FIG. 13), side-by-side fibers 120 (FIG. 14), segmented fibers 140 (FIG. 15), or lobed fibers 160 (FIG. 16) described above.

Figure 17:
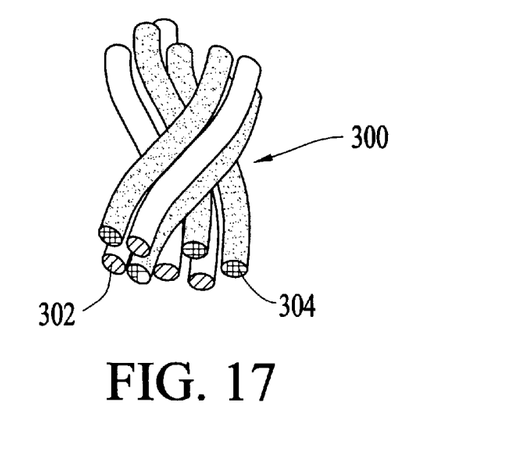
FIG. 17 is an enlarged schematic illustration of a yarn made with bicomponent fibers according to one embodiment of the present invention.

The filter element 26g (FIG. 10), embodying another alternate embodiment of the present invention, includes the membrane 60 attached to a woven substrate 62g. The woven substrate 62g is made from a bicomponent yarn 300 (FIG. 17). The yarn 300 includes a number of first fibers 302 made from the first material with the relatively higher melting temperature. The yarn 300 also includes a number of second fibers 304 made from the second material with the relatively lower melting temperature. The fibers 302, 304 could be mono-filaments or multiple filaments. The yarn 300 can be woven to provide a suitable structure for the substrate 62g.

The first fibers 302 in the yarn 300 are made from the first material with the relatively higher first melting temperature. The second fibers 304 in the yarn 300 are made from the second material with the second melting temperature that relatively is lower than the first melting temperature of the first material. The second fibers 304 in the yarn 300 melt first at a lower temperature than the first fibers 302 and are located in a position to easily contact the membrane 60. The first fibers 302 are relatively unaffected when exposed to the temperature at which the second material melts so the first fibers 302 retain their physical properties, such as tensile strength, elasticity and the like. There is enough difference between the melting temperatures of the two materials and the application of heat can be controlled sufficiently so that melting of only at least partially the second material occurs. It will be apparent that the yarn 300 could be made from any of the bicomponent fibers 100, 120, 140, 160 (FIGS. 13–16).

Figure 18:
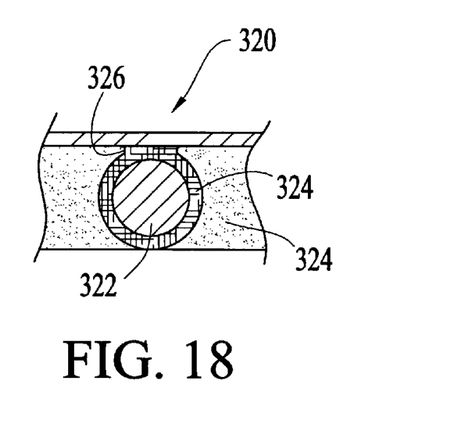
FIG. 18 is an enlarged schematic illustration of a bicomponent mesh substrate according to one embodiment of the present invention.

The filter element 26h (FIG. 11), embodying yet another alternate embodiment of the present invention, includes the membrane 60 and a substrate 62h made from a cast or formed mesh 320. The mesh 320 (FIG. 18) includes a lattice structure 322 made from the first material with the relatively higher melting temperature. The lattice structure 322 has a coating 324 at least in an area where the substrate 62h will contact the membrane with the second material with the second melting temperature. The coating 324 may completely encapsulate the first material of the lattice 322, as illustrated in FIG. 18, or be located in a position only to contact the membrane 60. The substrate 62h is constructed and located adjacent the membrane 60 in such a manner that the coating 324 of the second material with the relatively lower melting temperature is in a position where it can be utilized best to form an attachment 326 between the membrane 60 and substrate.

The second material of the coating 324 melts first at a lower temperature than the first material of the lattice 322 and is located in a position to easily contact the membrane 60. The first material of the lattice 322 is relatively unaffected when exposed to the temperature at which the second material of the coating 324 melts so the lattice retains its physical properties, such as tensile strength, elasticity and the like. There is enough difference between the melting temperatures of the two materials and the application of heat can be controlled sufficiently so that melting of only the second material occurs.

Figure 1:
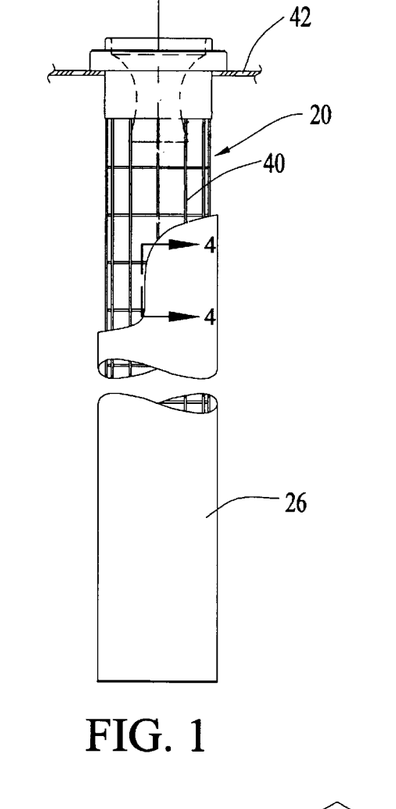
FIG. 1 is a schematic view of a bag filter having a filter element embodying the present invention.

In any of the embodiments described above, it will be noted that the melting of the second material could be done after a pleat forming operation. The pleats can be made to retain their shape when the first layer is exposed to be melting temperature at which the second material melts. This can be advantageous in certain applications, such as in the filters 22 (FIG. 2) and 24 (FIG. 3), where the pleats need to retain their shape during use. The melting of the second material could also be done after the filter element 26a–26b is formed to have a predetermined shape, such as a tube for the filter 20 (FIG. 1).

A method of making the filter element 26, according to the present invention, includes the steps of providing a substrate 62. The substrate 62 is selected from any suitable structure, such as the needled felt with a scrim 64b, 64d, 64e or 64f, scrimless needled felt 64a or 64c, woven fabric 300 and mesh 320. The substrate 62 is made from at least two different materials. A first one of the materials has a relatively high first melting temperature. A second one of the materials has a second melting temperature that is relatively lower than the first melting temperature. A filtering membrane 60 is provided. The filtering membrane 60 is preferably made from expanded polytetrafluoroethylene.

The filtering membrane 60 is supported by the substrate 62. The filtering membrane 60 contacts the substrate 62 at numerous locations of relatively small areas. Heat is applied to the components, for example to the filtering membrane 60 as it engages a heated roller for a predetermined time and maintained at a predetermined temperature. The heat that the second material is exposed to at a location adjacent the membrane 60 is greater than the second melt temperature but less than the first melt temperature. The membrane 60 is attached to the substrate by melting only the second one of the materials in the substrate onto the membrane to fix together the membrane and the substrate.

The preferred fibers 82, 84, 100, 120, 140, 160 are textile length from one-quarter inch and preferably from one-half inch up to about three inches or more in length. Such fibers can be in the form of the blend 80 of different melt temperature fibers 82, 84 or the bicomponent core-sheath 100, side-by-side 120, segmented 140 or lobed 160 fiber construction. The lower melting material is a significant portion and preferably a major portion of the surface of the fibers.

Specific conditions under which the thermal bonding lamination is achieved are illustrated in the examples below. The temperatures referred to are the temperatures to which the fibers are heated in order to achieve a good quality bond in Examples 1 and 2. In order to achieve high speed lamination, higher temperatures with shorter exposure times can be used.

The examples below illustrate various aspects of the invention.

EXAMPLE 1

A sample substrate of 15-oz./yd$^2$ polyester needled felt with a thickness of 0.075 inches was obtained from Southern Felt Company, Inc. in Trenton, S.C. The felt construction included the core-sheath fibers 100 (FIG. 13). The core-sheath fibers 100 are constructed of about 80% by volume of the core 102 with polyester first material having the relatively high first melt temperature. The core-sheath fibers 100 are constructed of about 20% by volume of the sheath 104 with polyester second material having the relatively lower second melt temperature.

The membrane 60 (QM001 made by BHA Technologies, Inc.) was thermal bonded to the sample substrate at a laminating temperature as low as 360° F. After some process optimization, the best results of laminating temperature for resultant air permeability through the filter element 26 and attachment of the membrane 60 to the substrate was determined to be about 400° F. The laminating temperature is measured at a surface of the thermal bonding equipment in contact with the filter element. Typically, lamination of a known polyester substrate is performed at a temperature more than 400° F. on the same thermal bonding equipment resulting in a base filter element with an air average permeability of about 6 to 7 Cubic Feet per Minute (CFM) per square foot, as measured by a Frazier air permeability instrument.

Figure 19:
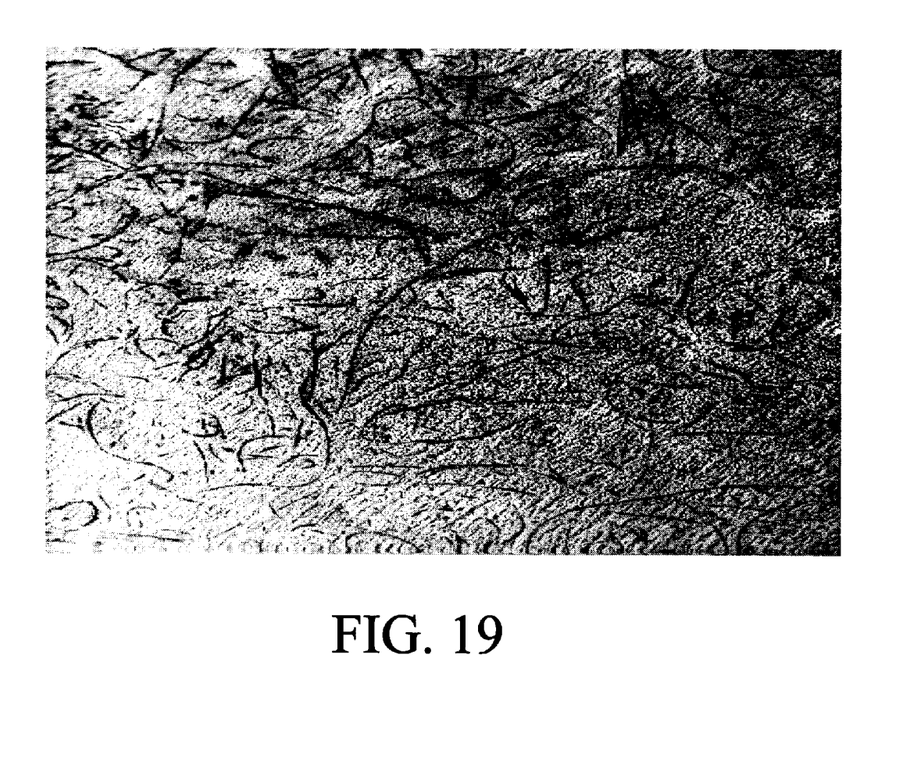
FIG. 19 is a SEM photograph illustrating an expanded polytetrafluoroethylene membrane attached to a bicomponent substrate of the present invention.

The filter element 26 as constructed in this Example 1 was tested and had an average air permeability of 11.30 CFM after lamination. A SEM photo of this filter element 26 is illustrated in FIG. 19 and shows a relatively small area of attachment between the membrane 60 and the substrate made according to this Example 1. A filter bag 20 (FIG. 1) made with the filter element 26 constructed according to this Example 1 is being tested. The preliminary results of the testing show improvement for bag durability, air permeability, filtration efficiency and pressure drop across the filter element during use compared to the base filter element.

EXAMPLE 2

Another sample substrate of 14-oz./yd$^2$ polyester felt with a thickness of 0.075 inches was obtained from Southern Felt Company. The sample was constructed to include the blend 80 (FIG. 12) of fibers 82, 84 by mixing polyester first fibers 82 having the relatively higher first melt temperature with polyester second fibers 84 having the relatively lower second melt temperature. The blend 80 was non-homogenous and contained about 80 vol.-% of the first fibers 82 with about 20 vol.-% of the second fibers 84. The first fibers 82 and second fibers were needled together to comprise the blend 80 without regard to the relative distribution of the first or second fibers.

The same membrane 60, as described above, was thermal bonded to the sample substrate at a laminating temperature as low as 360° F. After some process optimization, the best results of laminating temperature for resultant air permeability through the filter element 26 and attachment of the membrane 60 to the substrate was determined to be about 400° F. The filter element 26 constructed according to this Example 2 again showed a relatively large surface area free of melted polyester, similar to that illustrated in FIG. 19. The filter element 26 was tested and had an average air permeability of 9.82 CFM after lamination. The air permeability for the filter element 26 constructed according to this Example 2 is lower than for the filter element for Example 1 but still about 2 to 3 CFM greater than the base filter element.

EXAMPLE 3

A relatively small 16" by 10.5" sample substrate constructed to have first fibers 82 made from Nomex® and second fibers 84 made from a PEEK (Poly-ether-ether-ketone) cap was obtained from Tex Tech Industries. The substrate sample was 15.9 oz/yd$^2$, of which 4 oz/yd$^2$ is the PEEK cap, and a thickness of 0.075 inches. A DSC analysis was performed to determine the thermal characteristics of the PEEK polymer cap. The melting occurred at about 648° F. with a rather sharp transition. The Nomex begins to decompose at about 725° F.

Only two trial laminations were performed due to the relatively small sample, so no optimization of the substrate sample made according to this Example 3 was possible. Based on the DSC curves, it was decided to use a laminating temperature of about 640° F. Typically, a Nomex material is thermal bonded at 690° F. and laminated to a treatment that is applied by the felt supplier. The same membrane 60, as described above, was thermal bonded to the sample substrate.

The filter element 26 constructed according to the second trial of this Example 3 was tested and had an average air permeability of 5.50 CFM after lamination. The air permeability is lower than for the filter element for Example 2 and the base filter element. However, it is believed that improvements in air permeability compared to the base filter element can be achieved with enough sample material for optimization experimentation.

From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A filter element comprising:
    a substrate having a structure selected from the group consisting essentially of scrimed needled felt, scrimless needled felt, woven fabric and mesh, said substrate comprising at least two different materials, a first one of said materials having a first melting temperature and a second one of said materials having a second melting temperature lower than the first melting temperature;
    a porous membrane supported by said substrate; and
    an attachment between said substrate and said membrane, said attachment comprising said second one of said materials engaging said membrane to fix together said membrane and said substrate.

2. The filter element of claim 1 wherein said porous membrane is made from expanded polytetrafluoroethylene.

3. The filter element of claim 1 wherein said substrate comprises one of said scrimed needled felt and said scrimless needled felt, said substrate including a multiplicity of fibers comprising a blend of first fibers made from said first material having the first melting temperature and second fibers made from said second material having the second melting temperature.

4. The filter element of claim 1 wherein said substrate further includes a cap and a base, said cap located adjacent said membrane and made at least partially of the second material and said base made mostly from the first material.

5. The filter element of claim 4 wherein the thickness of said base is greater than the thickness of said cap.

6. The filter element of claim 1 wherein at least a portion of said substrate comprises a multiplicity of bicomponent staple fibers selected from the structures including core-sheath, side-by-side, segmented and lobed, a portion of each of said fibers made of said first material and another portion of each of said fibers made of said second material.

7. The filter element of claim 1 wherein said substrate comprises two layers, a first layer including a majority of first fibers and a second layer located adjacent said membrane and being made at least partially from said second material.

8. The filter element of claim 7 wherein said second material is melted to form said attachment without melting said first material.

9. The filter element of claim 1 formed into a desired shape and set to retain that shape.

10. A filter element adapted to be located in a gas stream, said filter element comprising:
    a bicomponent substrate having a structure selected from the group consisting essentially of scrimed needled felt, scrimless needled felt, woven fabric and mesh, said substrate comprising at least two different materials, a first one of said materials having a first melting temperature and a second one of said materials having a second melting temperature lower than the first melting temperature;
    an expanded polytetrafluoroethylene filtering membrane adapted to be located upstream relative to said substrate in the gas stream and supported by said substrate; and
    an attachment between said substrate and said expanded polytetrafluoroethylene filtering membrane, said attachment comprising said second one of said materials melted to engage said membrane and fix said membrane to said substrate.

11. The filter element of claim 10 wherein said substrate comprises one of said needled felt with a scrim and said scrimless needled felt, said substrate including a multiplicity of fibers comprising a blend of first fibers being made of said first material with the first melting temperature and second fibers made of said second material with the second melting temperature.

12. The filter element of claim 10 wherein said substrate further includes a cap, said cap located adjacent said membrane and being made at least partially of said second material.

13. The filter element of claim 10 wherein at least a portion of said substrate comprises a multiplicity of bicomponent staple fibers selected from the structures including core-sheath, side-by-side, segmented and lobed, a portion of each of said fibers made of said first material and another portion of each of said fibers made of said second material.

14. The filter element of claim 10 wherein said substrate comprises two layers, a first layer including a majority of first fibers and a second layer located adjacent said membrane and being made at least partially from said second material.

15. The filter element of claim 10 wherein said second material is melted to form said attachment without melting said first material.

16. A method of making a filter element, said method comprising the steps of:
    providing a substrate having a structure selected from the group consisting essentially of scrimed needled felt, scrimless needled felt, woven fabric and mesh, said substrate comprising at least two different materials, a first one of the materials having a first melting temperature and a second one of the materials having a second melting temperature lower than the first melting temperature;
    providing a filtering membrane;

supporting the filtering membrane with the substrate; and attaching the filtering membrane to the substrate by flowing the second one of the materials of the substrate onto the filtering membrane to fix together the filtering membrane and the substrate.

17. The method of claim 16 wherein said step of providing a filtering membrane comprises providing a filtering membrane made from expanded polytetrafluoroethylene.

18. The method of claim 16 further including the step of forming the filter element to a desired shape prior to melting the second one of the materials.

19. The method of claim 16 wherein said attaching step comprises melting only the second one of the materials onto the filtering membrane.

* * * * *